United States Patent [19]

Shibayama et al.

[11] 4,109,292
[45] Aug. 22, 1978

[54] CERAMIC CAPACITOR WITH NICKEL-SOLDER ELECTRODES

[75] Inventors: Masayoshi Shibayama, Haruna; Yuji Nakano, Komochi; Youji Shimizu, Haruna, all of Japan

[73] Assignee: Taiyo Yuden Co., Ltd., Tokyo

[21] Appl. No.: 711,445

[22] Filed: Aug. 4, 1976

[30] Foreign Application Priority Data

Aug. 8, 1975 [JP] Japan ................................ 50-95930

[51] Int. Cl.² ........................ H01G 1/005; H01G 4/06
[52] U.S. Cl. ................................... 361/321; 361/302; 361/305; 361/306
[58] Field of Search ............... 361/302, 309, 306, 305, 361/323, 321

[56] References Cited

U.S. PATENT DOCUMENTS

| 2,585,752 | 2/1952 | Dorst | 361/305 X |
| 3,256,472 | 6/1966 | Centurioni | 361/323 X |
| 3,457,539 | 7/1969 | Lupfer | 361/306 X |
| 3,891,901 | 6/1975 | Booe | 361/309 |
| 3,992,761 | 11/1976 | Mc Elroy | 361/309 X |

*Primary Examiner*—E. A. Goldberg
*Attorney, Agent, or Firm*—Woodcock, Washburn, Kurtz & Mackiewicz

[57] ABSTRACT

A tubular ceramic body has formed thereon inner and outer electrodes each comprising a nickel layer in direct contact with the ceramic body and a solder layer overlying the nickel layer. Of tin-lead composition, the solder layer is intended to make leads or the like readily solderable to the electrodes. According to the manufacturing process of the capacitor, the nickel layer is formed by electroless plating, and the solder layer by electroplating.

6 Claims, 9 Drawing Figures

CERAMIC CAPACITOR WITH NICKEL-SOLDER ELECTRODES

BACKGROUND OF THE INVENTION

This invention relates to capacitors and is directed more specifically to improvements in a capacitor of the type having inner and outer electrodes formed on a tubular ceramic body. The invention is also specifically directed to a process for the manufacture of such an improved ceramic capacitor.

A capacitor having inner and outer electrodes formed on a tubular ceramic body of barium titanate or the like (FIG. 1) has been known and used extensively. Each electrode of this type of capacitor usually takes the form of a silver layer or the lamination of nickel, copper and silver layers. Formed by firing a coating of pasted silver on the ceramic body, the silver electrodes have the advantage of affording a strong joint with the dielectric and of permitting the ready soldering thereto of leads or other means for electrical connection, besides being favorable in electrical characteristics. Capacitors with silver electrodes, however, are not mass-producible and are expensive.

The laminated nickel-copper-silver electrodes, on the other hand, are produced by first forming the nickel layer on the ceramic body by the electroless plating method and then by successively electroplating the copper and silver layers on the nickel layer. The silver layer in this latter case can be of minimum thickness because it is intended merely to improve the solderability of the electrodes, so that the cost of the capacitor can be materially reduced. As an additional advantage, this type of capacitor lends itself to mass-production since its electrodes are formed by plating.

The electrodes of this second type have a problem, however, arising particularly when their outermost silver layer is unduly reduced in thickness to economize the precious metal. Such a thin silver layer when heated permits exudation, through its pinholes, of the copper forming the intermediate layer. The copper exudate on oxidation renders the silver layer significantly less solderable, so that leads or other electrical connection means cannot be readily soldered to the electrodes. The poor solderability of the electrodes also results in the formation of poor joints between them and the electrical connection means and, possibly, in the cracking of the tubular ceramic body through exposure to localized heat for a prolonged period of time.

SUMMARY OF THE INVENTION

It is an object of this invention to provide a capacitor of the type having inner and outer electrodes formed on a tubular ceramic body, such that the electrodes are highly solderable and yet inexpensive in construction.

Another object of the invention is to provide a ceramic capacitor which has a minimum possibility of developing cracks in its dielectric body, and whose electrical characteristics do not substantially deteriorate, through exposure to localized heat during soldering operation that may be performed on the completed capacitor.

It is also an object of this invention to provide a process for inexpensively manufacturing the capacitor of the type specified, in a manner which permits mass production.

Summarized in its broadest aspect, the capacitor according to this invention comprises a tubular ceramic body, and inner and outer electrodes formed thereon so as to be electrically insulated from each other, with each electrode comprising a nickel layer formed on the ceramic body and a solder layer overlying the nickel layer.

The solder layer, which is intended to improve the solderability of the electrodes, can be fabricated from tin and lead, among other substances, and ranges in thickness from about 0.5 to 10 microns for the best results. The nickel layer ranges in thickness from about 0.2 to 10 microns.

If desired, the nickel layer can be composed of a fired first layer in direct contact with the ceramic body and an unfired second layer overlying the first layer. This construction affords a stronger joint between ceramic body and nickel layer.

According to the process of this invention, the nickel layer is first plated to the entire surfaces of a tubular ceramic body, followed by the plating of the solder layer over the nickel layer. The nickel and solder layers are then partly removed from the surfaces of the ceramic body to form inner and outer electrodes which are electrically insulated from each other.

It will be appreciated that the ceramic capacitor according to the invention can be mass-produced since the nickel and solder layers constituting its electrodes are both formed by plating. Preferably, the nickel layer is formed by electroless plating, and the solder layer by electroplating.

The above and other objects, features and advantages of this invention and the manner of attaining them will become more clearly apparent, and the invention itself will best be understood, upon consideration of the following description taken in connection with the accompanying drawings.

DETAILED DESCRIPTION

Figure 1:
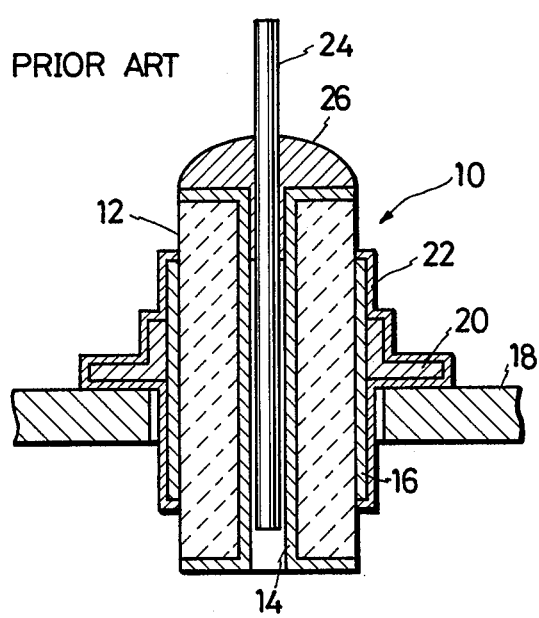
FIG. 1 is an axial sectional view of a prior art ceramic capacitor comparable to the capacitor according to this invention, the prior art capacitor being shown equipped with a lead and a conductive flange and mounted in position on a printed circuit board or like panel.

A prior art ceramic capacitor bearing the closest resemblance to that of this invention will be shown and described in some detail in order to make clear the problems attendant upon the prior art how they are solved by the invention. With reference to FIG. 1, the illustrated prior art ceramic capacitor 10 broadly comprises a tubular ceramic body 12 which is composed principally of, for example, barium titanate and which serves as the dielectric layer of the capacitor, an inner electrode 14 covering the interior and end faces of the ceramic body, and an outer electrode 16 covering part of the exterior surface of the ceramic body. The inner and outer electrodes 14 and 16 are of course electrically insulated from each other by the ceramic body.

For use in a feedthrough application, for example, the prior art ceramic capacitor 10 is shown to have a flange 20 of conductive material approximately at the center of its length in order to facilitate installation on a printed circuit board, metal chassis wall or like panel 18. The flange 20 is soldered at 22 to the outer electrode 16 to provide means for its electrical connection as well. For electrical connection of the inner electrode 14, a lead 24 of the capacitor itself or of some other electrical part is inserted into the interior of the ceramic body 12 and is soldered thereto at 26 so as to be in electrical contact with the inner electrode.

Figure 2:
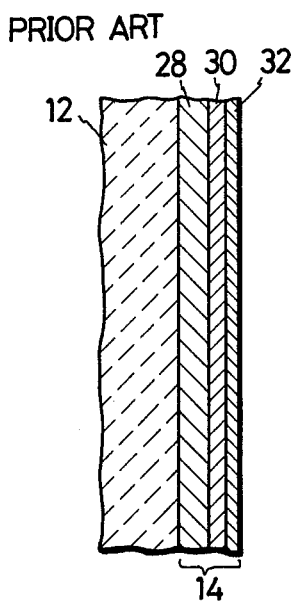
FIG. 2 is an enlarged, fragmentary sectional view showing one of the electrodes of the prior art ceramic capacitor of FIG. 1 in greater detail.

As illustrated on a greatly enlarged scale in FIG. 2, the inner electrode 14, as well as the outer electrode 16, is of multilayer construction comprising an innermost nickel layer 28, an intermediate copper layer 30 and an outermost silver layer 32, which have been formed by successive plating on the ceramic body.

The ceramic capacitor 10 of the foregoing prior art construction has a distinct advantage over that having silver electrodes, in that the former is mass-producible. The advantage is offset, however, by the fact that in spite of the presence of the outermost silver layers 32, the flange 20 and lead 24 are not necessarily solderable to the respective electrodes, particularly when the silver layers are not sufficiently thick. This is because the copper of the intermediate layers 30 exudes through pinholes in the silver layers 32 when the electrodes are heated, as at the time of soldering, the exudate being oxidized to make the silver layer surfaces significantly less solderable.

As a consequence, it has often taken from about four to five seconds to solder the flange 20 or lead 24 to the prior art ceramic capacitor 10. The lead 24, in particular, has been difficult to solder to the inner electrode 14 with a desired degree of strength. Furthermore, the ceramic body 12 has often developed cracks by being partially exposed to high temperatures over a prolonged period of time. These problems might be overcome if the outermost silver layers 32 where made thicker, but it would add much to the expense of the capacitor.

The present invention presents an excellent solution to the above problems of the prior art. The process for the manufacture of the ceramic capacitor according to the invention will hereinafter be described in terms of several specific Examples thereof with reference to FIGS. 3 through 9. The novel construction of the capacitor, to which the invention is also directed, will become apparent from the description of such Examples.

EXAMPLE I

Example I of the inventive process will be described with reference to FIGS. 3 through 7 which are sequential illustrations of the steps of the manufacturing process. There was first prepared a tubular ceramic body 34 shown in FIG. 3, which was of barium titanate dielectric material. This ceramic body 34 had an outside diameter of 3.15 millimeters, an inside diameter of 1.60 millimeters, and an axial length of 6.35 millimeters.

For the electroless nickel plating of the tubular ceramic body 34, 7.5 kilograms of nickel sulfate was first dissolved in 40 liters of water, and to this solution 2.5 kilograms of sodium hypophosphite and 2.5 kilograms of sodium acetate were added simultaneously. The solution was then diluted with about three to four times as much quality of water which had been heated to more than 70° C.

Figure 3:
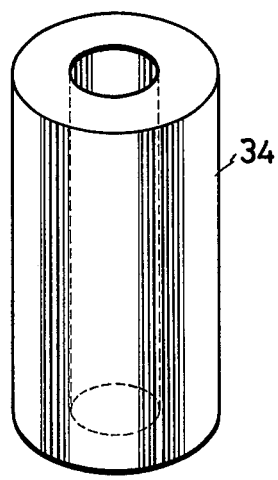
FIG. 3 is a perspective view of a tubular ceramic body employed for the manufacture of the ceramic capacitor according to this invention.

The tubular ceramic body 34 of FIG. 3 was immersed in the thus prepared nickel plating solution while being vibrated and was held immersed therein for about seven minutes. As a consequence, a nickel layer with a thickness of about 0.4 to 0.5 micron was formed on the entire surfaces of the ceramic body 34, as indicated at 36 in FIG. 4.

Generally speaking, the thickness of the nickel layer 36 should range from about 0.2 to 10 microns to afford favorable electrical characteristics.

Figure 4:
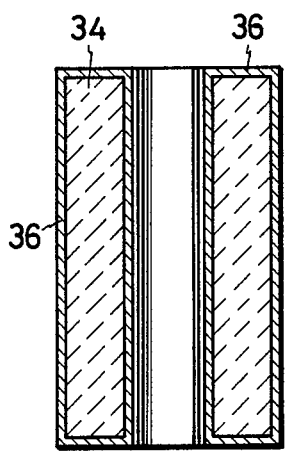
FIG. 4 is an axial sectional view showing the ceramic body of FIG. 3 together with a nickel layer plated to its entire surfaces.

Preparatory to the subsequent solder electroplating operation, the nickel plated ceramic body of FIG. 4 was cleansed with a thinner, rinsed, immersed in a 10 percent phenolsulfonic acid solution, and rinsed again. A solder layer was then electroplated to the thus pretreated nickel layer 36 on the ceramic body 34 by use of a plating bath of the following composition:

| | | |
|---|---|---|
| Stannous phenolsulfonate | 120 | g/l |
| Lead phenolsulfonate | 20 | g/l |
| Phenolsulfonic acid | 300 | g/l |
| Sn++ | 9 | g/l |
| Pb | 1 | g/l |
| Brightener ("UTB No. 1" produced by Ishihara Yakuhin K.K., of Japan) | 20 | g/l |
| Brightener ("UTB No. 2" produced by Ishihara Yakuhin K.K.) | 20 | g/l |
| Brightener ("UTB PS-AC" produced by Ishihara Yakuhin K.K.) | 6 | cc/l |

The bath was heated to a temperature of 16° C, and the workpiece of FIG. 4 was made cathodic in this bath. A plate fabricated of 95 weight percent tin and five weight percent lead was connected as an anode. An electric current was introduced through the anode for about 20 minutes, with a current density of 0.5 ampere per square decimeter.

Figure 5:
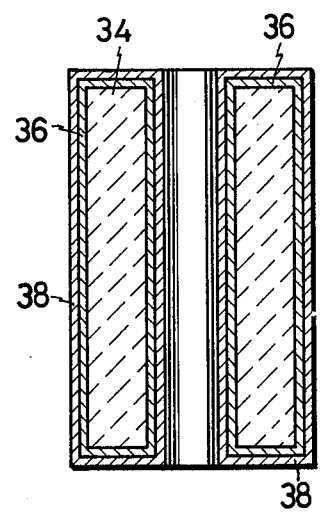
FIG. 5 is a similar view showing the ceramic body together with the nickel layer and a solder layer further plated thereto.

Thus, as illustrated in FIG. 5, a solder layer 38 with a thickness of about two microns was formed in overlying relationship to the nickel layer 36 on the ceramic body 34. The solder layer 38 was composed of 95.5 weight percent tin and 4.5 weight percent lead.

As a general rule, the solder layer 38 should be composed of from about 70 to 99.9 weight percent tin and from about 0.1 to 30 weight percent lead. This is because the solder layer containing more than about 99.9 weight percent tin would suffer oxidation on its surfaces and would not accept solder readily, and because the solder layer containing more than about 30 weight percent lead would give an adverse effect on the subsequent grinding operation, as will be later explained in more detail. Also, the solder layer 38 should range in thickness from about 0.5 to 10 microns so that it may be readily solderable and may not adversely affect the grinding operation.

After the above electroplating of the solder layer 38, the workpiece was subjected to aftertreatment comprising the sequential steps of rinsing, treatment in a 10 percent $Na_3PO_4$ solution at a temperature of 60° C, rinsing with cold water, rinsing with hot water, and drying.

Subsequently, the end portions of the nickel layer 36 and solder layer 38 overlying the exterior, circumferential surface of the ceramic body 34 were ground off by means of a diamond wheel, as indicated at 40 in FIG. 6. The nickel and solder layers 36 and 38 were thus divided into an inner electrode 42 covering the interior and end faces of the ceramic body 34 and an outer electrode 44 covering part of the exterior surface of the ceramic body. The inner and outer electrodes 42 and 44 are of course electrically insulated from each other by the ceramic body 34. Hardly any clogging of the diamond wheel took place during the grinding operation since the solder layer 38 contained more than 70 weight percent tin and since its thickness was less than 10 microns.

Figure 6:
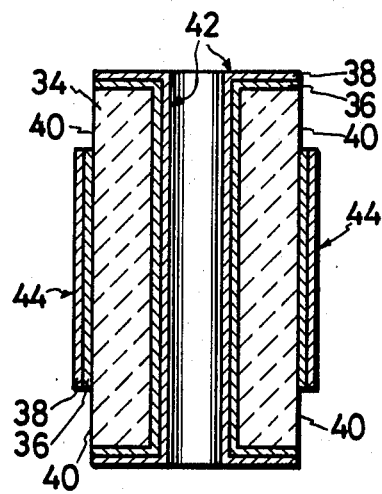
FIG. 6 is a similar view showing the nickel- and solder-plated ceramic body after parts of the plated layers have been removed to form inner and outer electrodes.
Figure 7:
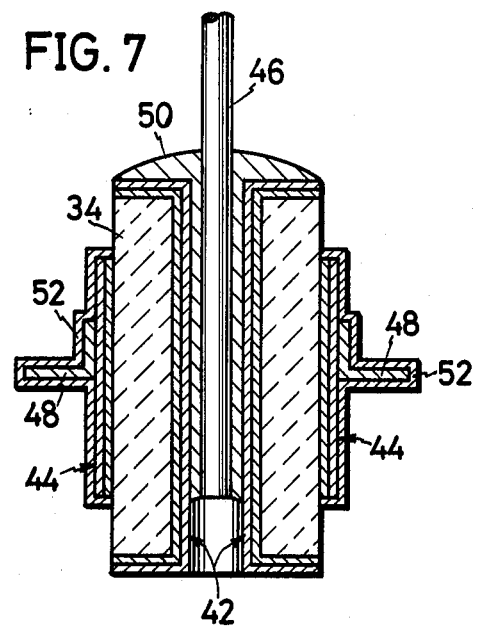
FIG. 7 is a similar view showing the capacitor of FIG. 6 together with a lead and a conductive flange soldered thereto.

In one possible application of the ceramic capacitor manufactured as hereinbefore described and constructed as shown in FIG. 6, a lead 46 and a flange 48 of conductive material are attached as illustrated in FIG. 7 to facilitate its electrical connection to an external electric circuit and its installation. The lead 46, which may be an integral part of the capacitor itself or of some other electrical part, is inserted deeply into the interior of the tubular ceramic body 34, preferably to a depth in excess of half the axial length of the body, and is soldered at 50 to and in electrical contact with the inner electrode 42. The flange 48 is likewise soldered at 52 to and in electrical contact with the outer electrode 44 so as to surround same. The solder in use can be of the usual tin-lead composition.

In attaching the lead 46 to the capacitor, for example, a suitable amount of solder may be placed upon the top end face of the capacitor as by a soldering iron after insertion of the lead into its interior. The solder will partly flow down into the interior of the capacitor and will form a strong joint between lead and inner electrode. Since the outer solder layer 38 of the electrode accepts solder so readily that the soldering operation can be completed usually in about one second. There is accordingly almost no possibility of the ceramic body 34 cracking during the soldering operation.

By way of comparative experimentation, a soldering iron heated to a temperature of 400° C was held in touch for about 4 seconds with one of the end faces of each of 100 prior art ceramic capacitors of FIG. 1 construction and of 100 inventive capacitors of FIG. 6 construction. Cracks were found in 41 of the prior art capacitors but in only 28 of the inventive capacitors.

As mentioned previously, it takes from about 4 to 5 seconds to solder the lead to the prior art ceramic capacitor because of the oxidation of the copper exudate on the outermost silver layer, so that the above specified percentage of the prior art capacitors are bound to actually develop cracks as leads are soldered thereto. However, since it takes only about one second to solder a lead to the inventive capacitor of FIG. 6, it can be stated that the ceramic body 34 of the inventive capacitor has substantially no possibility of cracking by the soldering operation. It should further be noted that the ceramic body of the inventive capacitor is significantly less likely to suffer cracks than that of the prior art even if the soldering operation takes about four seconds for some reason or other. This obviously is due to the improved wetting qualities of the solder realized by the presence of the outer solder layer 38 of the electrodes according to this invention.

It is also noteworthy that the ceramic capacitor according to the invention is materially less expensive than the prior art capacitor having silver electrodes. The total cost of the electrodes of the capacitor according to the invention is about one tenth that of the silver electrodes of the prior art capacitor. The mass production of the capacitor according to the invention is possible since the nickel and solder layers 36 and 38 of its electrodes are both formed by plating. The moisture resistance and other properties of the capacitor according to the invention have been found to be approximately equivalent to those of the prior art.

EXAMPLE II

This second Example differs from Example I in that the bath used for the electroplating of the solder layer contains fluoboric acid ($HBF_4$) instead of phenolsulfonic acid.

The nickel layer 36 shown in FIG. 4 was first produced on the tubular ceramic body 34 in exact accordance with the procedure of Example I, except that the thickness of the nickel layer was increased to more than 0.5 micron in order to protect the ceramic body against deterioration by fluorides.

Preparatory to the subsequent electroplating operation of the solder layer, the nickel plated ceramic body of FIG. 4 was cleansed with a thinner, rinsed, immersed in a 10 percent fluoboric acid solution, and rinsed again. The thus pretreated workpiece was then subjected to the electroplating operation with use of a bath of the following composition:

| | | |
|---|---|---|
| SN++ | 20 | g/l |
| Pb | 8 | g/l |
| $HBF_4$ | 40 | g/l |
| Brightener ("UTB No. 1" produced by Ishihara Yakuhin K.K.) | 40 | g/l |
| Brightener ("UTB No. 2" produced Ishihara Yakuhin K.K.) | 60 | g/l |
| Formalin | 10 | g/l |

The pretreated workpiece of FIG. 4 was made cathodic in this bath, and a plate fabricated of 70 weight percent tin and 30 weight percent lead was used as an anode. An electric current was introduced through the anode for about 20 minutes, with a current density of 0.5 ampere per square decimeter. The resultantly produced solder layer 38 had a thickness of more than 0.5 micron. The other details of the manufacturing process and the construction of the completed capacitor are as set forth in Example I.

EXAMPLE III

Figure 8:
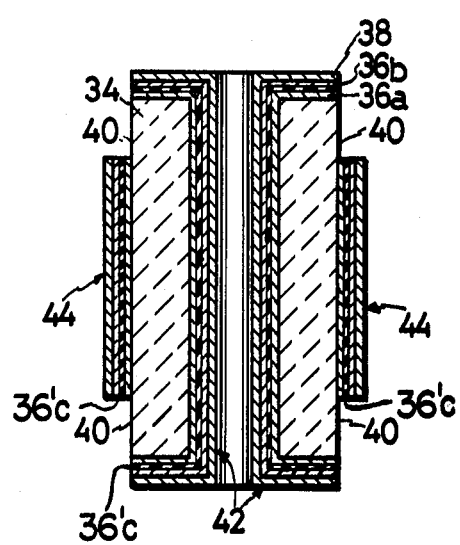
FIG. 8 is an axial sectional view of another preferred form of the capacitor according to this invention.

FIG. 8 illustrates the ceramic capacitor produced in this third Example, which differs from the capacitor of FIG. 6 in that the former has first and second nickel layers 36a and 36b underlying the solder layer 38.

In accordance with the procedure given in Example I, the first nickel layers 36a was formed by the electroless plating method on the entire surfaces of the tubular ceramic body 34 to a thickness of about 0.4 to 0.5 micron. The first nickel layer 36a was then subjected to firing treatment in an oxidative atmosphere, by placing the workpiece in a heating surface. The furnace temperature was gradually raised from room temperature up to about 370° C in 50 to 60 minutes, then maintained at 370° C for 3 to 5 minutes, and then lowered from 370° C to room temperature in 30 to 40 minutes. Generally, the firing temperature may be anywhere between about 300° and 400° C.

This firing treatment is effective to strengthen the joint between ceramic body and first nickel layer. Furthermore, at least on part of the exposed surfaces of the first nickel layer, there is formed an insulating layer 36c which is made up of oxide layer and nickel phosphide layer, the latter being produced since the first nickel layer contains some phosphorus.

The second nickel layer 36b with a thickness of about 0.4 to 0.5 micron was then formed by electroless plating on the fired first nickel layer 36a through the same procedure as above. Also in accordance with the procedure given in Example I, the solder layer 38 was then electroplated on the second nickel layer 36b to a thickness of about 2 microns.

Thereafter the opposite end portions 40 of the first and second nickel layers 36a and 36b and solder layer 38 overlying the circumferential surface of the ceramic body 34 were ground off by means of a diamond wheel. These layers were thus divided into the inner electrode 42 covering the interior and end faces of the ceramic body 34 and the outer electrode 44 covering part of the exterior surface of the ceramic body, which electrodes are electrically insulated from each other.

The lead 46 and conductive flange 48 may be soldered to the inner and outer electrodes 42 and 44 of the ceramic capacitor of FIG. 8 as described previously in connection with FIG. 7. The capacitor of FIG. 8 has the advantage that the stress which may be exerted on its inner and outer electrodes upon solidification of the solder is not transmitted to the interface between ceramic body 34 and first nickel layer 36a but is absorbed by the aforesaid insulating layer formed partly between first and second nickel layers. For this reason, the first nickel layer 36a will not separate from the ceramic body 34 to the slightest degree, even though the first and second nickel layers 36a and 36b may partly separate from each other. Such partial separation of the first and second nickel layers does not substantially affect the electrical characteristics of the capacitor.

MODIFICATION

Figure 9:
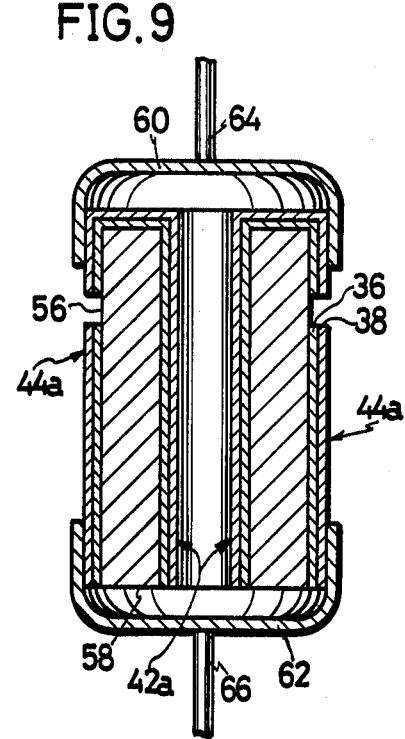
FIG. 9 is an axial sectional view of a modified form of the capacitor according to the invention, the modified capacitor being shown complete with a pair of end caps of conductive material having leads attached thereto.

FIG. 9 illustrates another practical form of the ceramic capacitor according to this invention, which may be considered an alternative to that illustrated in FIG. 7. Like the capacitor of FIG. 7, the modified capacitor of FIG. 9 also has its inner and outer electrodes 42a and 44a formed of the nickel layer 36 in direct contact with the tubular ceramic body 34 and the solder layer 38 overlying the nickel layer.

In this modified capacitor, however, the nickel and solder layers 36 and 38 are partly removed at 56 and 58 to form the inner electrode 42a covering the interior, upper end face, and adjacent part of the exterior surface of the ceramic body 34, and the outer electrode 44a covering part of the external surface of the ceramic body down to its lower end face.

In order to provide means for electrical connection of the inner and outer electrodes 42a and 44a to an external circuit, a pair of metal-made end caps 60 and 62 complete with leads 64 and 66 are fitted over the opposite ends of the capacitor, in electrical contact with the inner and outer electrodes respectively. The caps 60 and 62 are further soldered to the respective electrodes 42a and 44a. Since each electrode has the outer solder layer 38, the end caps can be readily and strongly soldered thereto. It will be apparent that each electrode of this modified capacitor can also be made of first and second nickel layers in addition to the outer solder layer, like that of the FIG. 8 capacitor.

The foregoing is considered as illustrative only of the principles of this invention. Further, since numerous modifications and changes will readily occur to those skilled in the art, and since the invention may be adapted for varying conditions of service other than those considered herein, it is not desired to limit the invention to the exact details of this disclosure. It is therefore appropriate that the invention be construed broadly and in a manner consistent with the fair meaning or proper scope of the appended claims.

We claim:

1. A capacitor comprising a tube of ceramic, and inner and outer electrodes formed on said ceramic tube so as to be electrically insulated from each other, each of said inner and outer electrodes comprising a first nickel layer formed on and in direct contact with said ceramic tube, an insulating layer formed on said first nickel layer, an unfired second nickel layer overlying said insulating layer, and a plated solder layer overlying said second nickel layer.

2. The capacitor as recited in claim 1, wherein said first nickel layer has a thickness in the range of from about 0.4 to about 0.5 micron.

3. The capacitor as recited in claim 1, wherein said second nickel layer has a thickness in the range of from about 0.4 to about 0.5 micron.

4. The capacitor as recited in claim 1, wherein said solder layer has a thickness in the range from about 0.5 to about 10 micron.

5. The capacitor as recited in claim 1, wherein said solder layer consists essentially of tin and lead.

6. The capacitor as recited in claim 5, wherein said solder layer is composed of from about 70.0 to about 99.9% by weight of tin and from about 0.1 to about 30.0% by weight of lead.

* * * * *